(12) United States Patent
Lin

(10) Patent No.: US 8,964,133 B2
(45) Date of Patent: Feb. 24, 2015

(54) TOUCH DISPLAY DEVICE

(71) Applicant: Chih-Chung Lin, Taipei (TW)

(72) Inventor: Chih-Chung Lin, Taipei (TW)

(73) Assignee: Chih-Chung Lin, Taipei (TW)

( * ) Notice: Subject to any disclaimer, the term of this patent is extended or adjusted under 35 U.S.C. 154(b) by 187 days.

(21) Appl. No.: 13/760,057

(22) Filed: Feb. 6, 2013

(65) Prior Publication Data
US 2014/0168529 A1 Jun. 19, 2014

(30) Foreign Application Priority Data

Dec. 19, 2012 (TW) .............................. 101148225 A

(51) Int. Cl.
*G02F 1/1333* (2006.01)
*G02F 1/1345* (2006.01)
*G02F 1/1335* (2006.01)

(52) U.S. Cl.
CPC ........ *G02F 1/13338* (2013.01); *G02F 1/13452* (2013.01); *G02F 1/133528* (2013.01)
USPC ................ 349/12; 349/96; 349/122; 349/110

(58) Field of Classification Search
CPC ... G06F 3/0412; G06F 3/0416; G06F 3/0488; G06F 2203/04104; G06F 2203/04107; G06F 2203/04112; G06F 2203/04106; G02F 1/13338; G02F 1/136286; G02F 1/1333; G02F 1/133305; G02F 1/133528; G02F 1/1345; G02F 2001/133334; G02F 2001/133388; G02F 2001/136218; G02F 2202/28; G02F 2202/22; H05K 9/0067; H01L 2224/83851; H01L 23/60; H01L 24/83; H01L 27/323; H01L 51/5246; H01L 51/5284
USPC ........ 345/173, 174, 104, 90; 349/12, 158, 96, 349/110, 122, 139, 187, 150; 178/18.03, 178/18.06, 18.05, 18.01, 19.01; 257/59, 72, 257/71, 91
See application file for complete search history.

(56) References Cited

U.S. PATENT DOCUMENTS 8,610,859 B2 * 12/2013 Kim et al. ...................... 349/139
8,816,982 B2 * 8/2014 Kim et al. ...................... 345/173

* cited by examiner

*Primary Examiner* — Thoi Duong

(57) ABSTRACT

A touch display device includes a touch sensing unit, a first conductive adhesive layer, a second conductive adhesive layer, a flexible printed circuit board, a liquid crystal display unit, a first adhesion layer and a second adhesion layer. The first adhesion layer serves to adhere the touch sensing unit to the liquid crystal display unit. The touch sensing unit includes a transparent substrate, multiple first sensing electrodes and multiple second sensing electrodes. The transparent substrate has a touch section and a peripheral section around the touch section. The first sensing electrodes are disposed on one side of the transparent substrate and positioned on the touch section. The second sensing electrodes are disposed in the liquid crystal display unit. The touch display device increases the ratio of good products and lowers the manufacturing risk.

14 Claims, 3 Drawing Sheets

TOUCH DISPLAY DEVICE

This application claims the priority benefit of Taiwan patent application number 101148225 filed on Dec. 19, 2012.

BACKGROUND OF THE INVENTION

1. Field of the Invention

The present invention relates generally to a touch display device, and more particularly to a touch display device, which increases the ratio of good products and lowers the manufacturing risk.

2. Description of the Related Art

Along with the popularization of various mobile devices, human/device interface devices are widely applied to the mobile devices such as personal digital assistants (PDA), mobile phones and laptops. The human/device interface devices make the operation of the mobile devices more humanized. Especially, touch screen plays an important role in humanization of the operation of the mobile devices.

Currently, the integration methods of touch panel and liquid crystal panel can be mainly classified into on-cell touch technique and in-cell touch technique. With respect to the on-cell touch technique, the X-axis sensors and the Y-axis sensors of the projection capacitive touch panel are together made on a back face of the color filter (CF) of the touch panel as an integrated structure of the color filter.

With respect to the in-cell touch technique, the X-axis sensors and the Y-axis sensors are positioned in the LCD cell structure. In other words, in the in-cell touch technique, the touch sensors are integrated with the display panel, whereby the display panel itself has touch function. In this case, it is unnecessary to additionally attach or assemble the display panel with a touch panel. This technique is generally developed by TFT LCD panel manufacturers.

However, in both the in-cell touch technique and the on-cell touch technique, multiple sensors (X-axis sensors and Y-axis sensors) are disposed on the upper glass substrate or lower glass substrate of the LCD display panel. This increases the cost. Moreover, in the manufacturing process, the X-axis sensors and the Y-axis sensors must be bridged. This necessitates multiple masks so that the manufacturing process is complicated. As a result, the ratio of good products is lowered and the manufacturing cost is increased. Therefore, there is still room to improve the conventional touch display device.

According to the above, the conventional touch display device has the following shortcomings:
1. The manufacturing risk is high.
2. The ratio of good products is lowered.
3. The manufacturing cost is increased.

SUMMARY OF THE INVENTION

It is therefore a primary object of the present invention to provide a touch display device, which increases the ratio of good products and lowers the manufacturing risk.

It is a further object of the present invention to provide the above touch display device, which is manufactured at lower cost.

To achieve the above and other objects, the touch display device of the present invention includes a touch sensing unit, a first conductive adhesive layer, a second conductive adhesive layer, a flexible printed circuit board, a liquid crystal display unit, a first adhesion layer and a second adhesion layer. The touch sensing unit includes a transparent substrate, a shield layer, multiple first sensing electrodes and multiple second sensing electrodes. The transparent substrate has a touch section and a peripheral section around the touch section. The shield layer is disposed on the peripheral section. The first sensing electrodes are disposed on the touch section. Two ends of the first sensing electrodes extend onto the shield layer. The first conductive adhesive layer is disposed at one end of the first sensing electrodes on the peripheral section.

One end of the flexible printed circuit board is disposed on the first conductive adhesive layer and electrically connected to the first sensing electrodes via the first conductive adhesive layer. The liquid crystal display unit has a liquid crystal panel, a first polarizer and a second polarizer. The second sensing electrodes are disposed between one side of the first polarizer and one side of the liquid crystal panel. The second polarizer is disposed on the other side of the liquid crystal panel. The first adhesion layer is disposed between the first polarizer and the first sensing electrodes and one end of the flexible printed circuit board on the first sensing electrodes. The first adhesion layer serves to adhere the touch sensing unit to the liquid crystal display unit. The second conductive adhesive layer is disposed between one end of the second sensing electrodes on the peripheral section and the first polarizer. The other end of the flexible printed circuit board is attached to one side of the second conductive adhesive layer, which side is proximal to the first polarizer. The second conductive adhesive layer serves to electrically connect the other end of the flexible printed circuit board to the second sensing electrodes. The second adhesion layer is disposed between the first polarizer and the second sensing electrodes and the other end of the flexible printed circuit board on the second sensing electrodes. The second adhesion layer serves to adhere the first polarizer to the second sensing electrodes. The touch display device of the present invention lowers the manufacturing risk and increases the ratio of good products so that the manufacturing cost is lowered.

Alternatively, the touch display device of the present invention includes a touch sensing unit, a first conductive adhesive layer, a second conductive adhesive layer, a flexible printed circuit board, a liquid crystal display unit, a first adhesion layer and a second adhesion layer. The touch sensing unit includes a transparent substrate, a shield layer, multiple first sensing electrodes and multiple second sensing electrodes. The transparent substrate has a touch section and a peripheral section around the touch section. The first sensing electrodes are disposed on one side of the transparent substrate and positioned on the touch section. Two ends of the first sensing electrodes correspond to the peripheral section. The shield layer is disposed on the other side of the transparent substrate on the peripheral section. The first conductive adhesive layer is disposed at one end of the first sensing electrodes on the peripheral section.

One end of the flexible printed circuit board is disposed on the first conductive adhesive layer and electrically connected to the first sensing electrodes via the first conductive adhesive layer. The liquid crystal display unit has a liquid crystal panel, a first polarizer and a second polarizer. The second sensing electrodes are disposed between one side of the first polarizer and one side of the liquid crystal panel. The second polarizer is disposed on the other side of the liquid crystal panel. The first adhesion layer is disposed between the first polarizer and the first sensing electrodes and one end of the flexible printed circuit board on the first sensing electrodes. The first adhesion layer serves to adhere the touch sensing unit to the liquid crystal display unit.

The second conductive adhesive layer is disposed between one end of the second sensing electrodes on the peripheral section and the first polarizer corresponding to the first conductive adhesive layer. The other end of the flexible printed circuit board is attached to one side of the second conductive adhesive layer, which side is proximal to the first polarizer. The second conductive adhesive layer serves to electrically connect the other end of the flexible printed circuit board to the second sensing electrodes. The second adhesion layer is disposed between the first polarizer and the second sensing electrodes and the other end of the flexible printed circuit board on the second sensing electrodes. The second adhesion layer serves to adhere the first polarizer to the second sensing electrodes. The touch display device of the present invention lowers the manufacturing risk and increases the ratio of good products so that the manufacturing cost is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
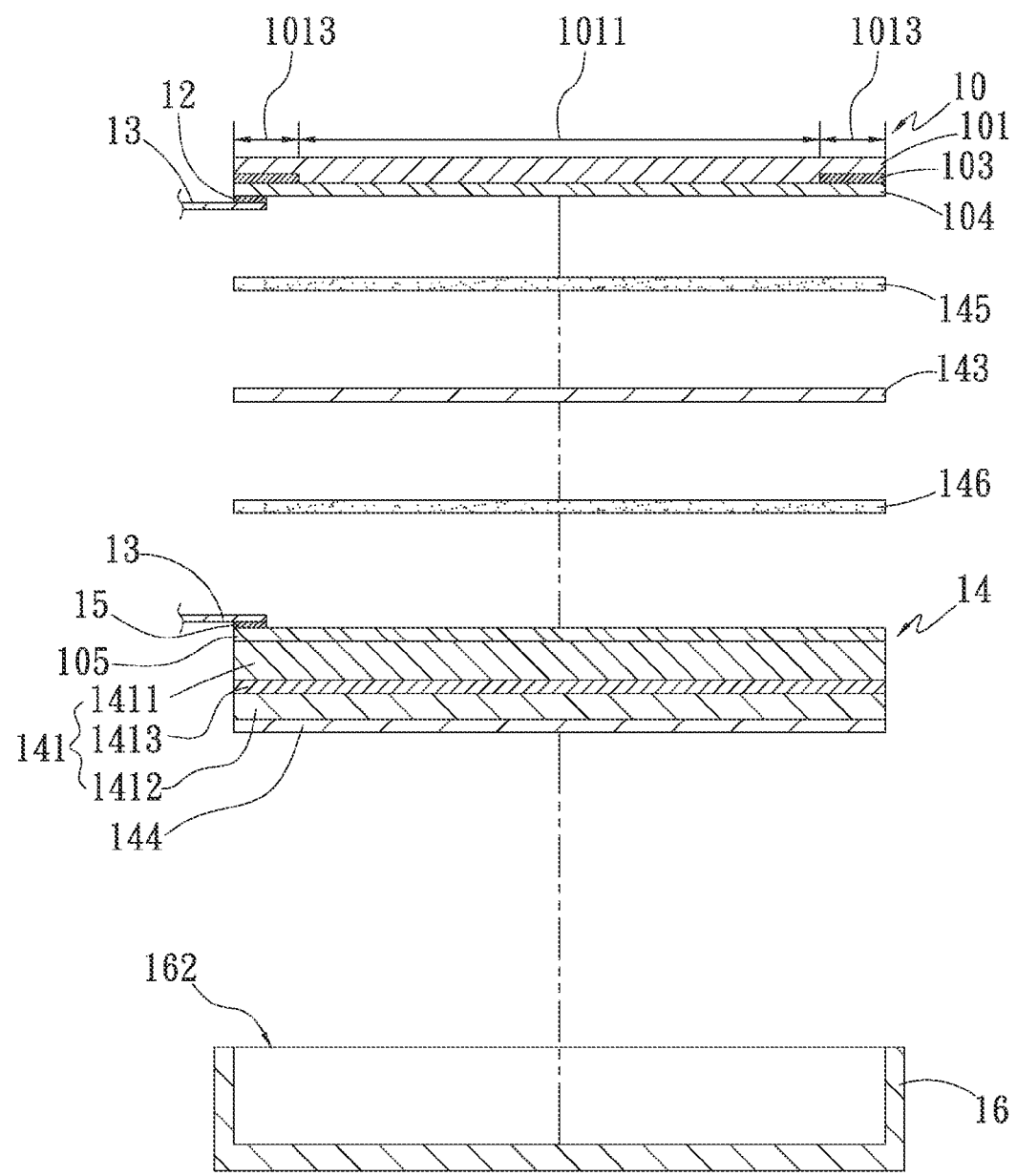
FIG. 1 is a sectional exploded view of a first embodiment of the present invention.
Figure 2:
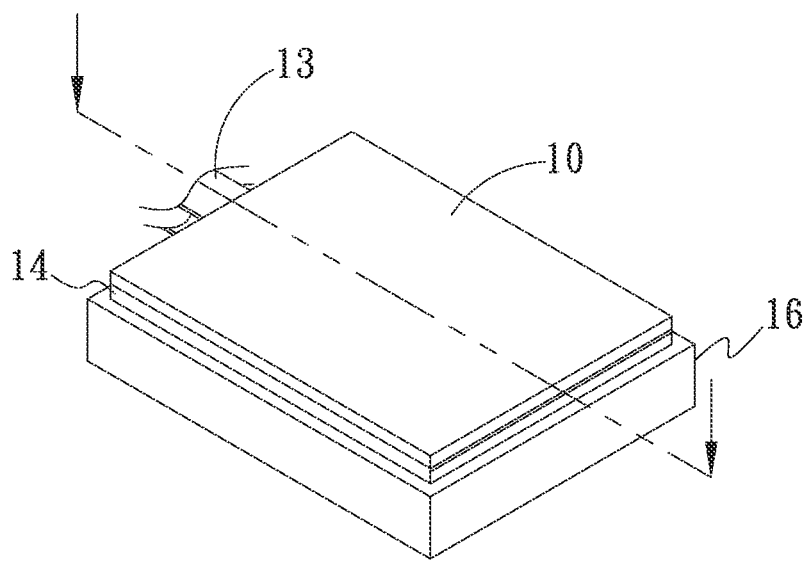
FIG. 2 is a perspective assembled view of the first embodiment of the present invention.

Please refer to FIGS. 1 and 2. FIG. 1 is a sectional exploded view of a first embodiment of the present invention. FIG. 2 is a perspective assembled view of the first embodiment of the present invention. According to the first embodiment, the touch display device 1 of the present invention includes a touch sensing unit 10, a first conductive adhesive layer 12, a second conductive adhesive layer 15, a flexible printed circuit (FPC) board 13, a liquid crystal display unit 14, a first adhesion layer 145 and a second adhesion layer 146. The touch sensing unit 10 includes a transparent substrate 101, a shield layer 103, multiple first sensing electrodes 104 and multiple second sensing electrodes 105. In this embodiment, the transparent substrate 101 is made of a material, which is, but not limited to, glass for illustration purposes only. In practice, alternatively, the material of the transparent substrate 101 can be selected from a group consisting of polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

The transparent substrate 101 has a touch section 1011 and a peripheral section 1013 around the touch section 1011. The shield layer 103 is disposed on the peripheral section 1013 for providing concealing effect. In this embodiment, the shield layer 103 is made of such as a nontransparent insulation material by means of printing or spraying.

Figure 3:
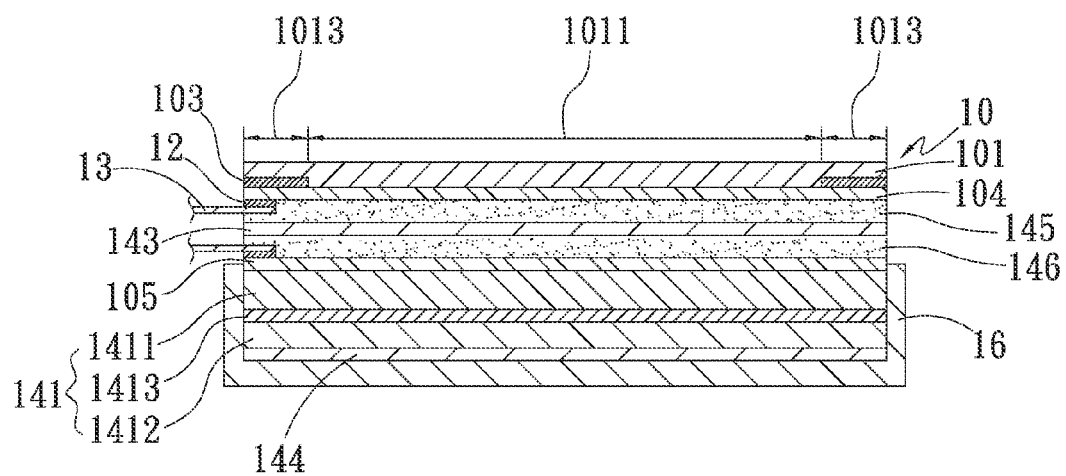
FIG. 3 is a sectional assembled view of the first embodiment of the present invention.

The first and second sensing electrodes 104, 105 are indium tin oxide (ITO) coatings or antimony tin oxide (ATO) coatings. The multiple first sensing electrodes 104 are disposed on the touch section 1011. Two ends of the first sensing electrodes 104 extend onto the shield layer 103 as shown in FIG. 3. The shield layer 103 and the first sensing electrodes 104 are disposed on the same side of the transparent substrate 101. That is, the shield layer 103 is first formed on the peripheral section 1013 of one side of the transparent substrate 101.

Then the first sensing electrodes 104 are formed on the side of the transparent substrate 101. The first sensing electrodes 104 are positioned on the touch section 1011 with two ends of the first sensing electrodes 104 positioned above the shield layer 103 of the peripheral section 1013. In this embodiment, the first sensing electrodes 104 are formed on the side of the transparent substrate 101 by means of, but not limited to, sputtering deposition. In practice, the first sensing electrodes 104 can be alternatively formed on the side of the transparent substrate 101 by means of gelatinization, electroplating or evaporation.

Please refer to FIGS. 1 and 3. The first conductive adhesive layer 12 is disposed at one end of the first sensing electrodes 104 on the peripheral section 1013. That is, the first conductive adhesive layer 12 is positioned on one side of the end of the first sensing electrodes 104, which side is distal from the shield layer 103. In this embodiment, the first and second conductive adhesive layers 12, 15 are, but not limited to, anisotropic conductive films (ACF) for illustration purposes only. In practice, the first and second conductive adhesive layers 12, 15 can be made of any adhesive material that has a vertical electrical conduction but horizontal insulation property and bonding function.

One end of the flexible printed circuit board 13 is disposed on the first conductive adhesive layer 12. In other words, the end of the flexible printed circuit board 13 is attached to one side of the first conductive adhesive layer 12, which side is distal from the first sensing electrodes 104. The end of the flexible printed circuit board 13 is electrically connected to the corresponding first sensing electrodes 104 via the first conductive adhesive layer 12.

The liquid crystal display unit 14 has a liquid crystal panel 141, a first polarizer 143 and a second polarizer 144. The second sensing electrodes 105 are disposed between one side of the first polarizer 143 and one side of the liquid crystal panel 141. The second sensing electrodes 105 are disposed on the side of the liquid crystal panel 141. The second polarizer 144 is disposed on the other side of the liquid crystal panel 141.

Please further refer to FIGS. 1 and 2. The liquid crystal panel 141 includes a first substrate 1411, a second substrate 1412 and a liquid crystal layer 1413. In this embodiment, the first and second substrates 1411, 1412 are made of a material, which is, but not limited to, glass for illustration purposes only. The second sensing electrodes 105 are formed on one side of the first substrate 1411, which side is distal from the liquid crystal layer 1413. The second sensing electrodes 105 are horizontally arranged on the first substrate 1411 (in X-axis direction) to intersect the first sensing electrodes 104, which are vertically arranged on the transparent substrate 101 (in Y-axis direction).

In this embodiment, the second sensing electrodes 105 are formed on the side of the first substrate 1411, which side is distal from the liquid crystal layer 1413, (that is, the side of the liquid crystal panel 141) by means of, but not limited to, sputtering deposition. In practice, the second sensing electrodes 105 can be alternatively formed on the side of the first substrate 1411, which side is distal from the liquid crystal layer 1413 by means of gelatinization, electroplating or evaporation.

The second conductive adhesive layer 15 is disposed between one end of the second sensing electrodes on the peripheral section 1013 and the first polarizer 143 corresponding to the first conductive adhesive layer 12. The other end of the flexible printed circuit board 13 is attached to one side of the second conductive adhesive layer 15, which side is proximal to the first polarizer 143. The other side of the second conductive adhesive layer 15 is attached to the end of the second sensing electrodes 105 on the peripheral section 1013. The second conductive adhesive layer 15 serves to electrically connect the other end of the flexible printed circuit board 13 to the second sensing electrodes 105.

One side of the second substrate 1412, which side is distal from the liquid crystal layer 1413 is attached to one side of the second polarizer 144. The liquid crystal layer 1413 is sandwiched between the first substrate 1411 and the second substrate 1412 to together form the liquid crystal panel 141. The first and second adhesion layers 145, 146 are made of optical clear adhesive (OCA), optical clear resin (OCR) or liquid optical clear adhesive (LAL).

Please further refer to FIGS. 1 and 3. The first adhesion layer 145 is disposed between the first polarizer 143 and the first sensing electrodes 104 and one end of the flexible printed circuit board 13 on the first sensing electrodes 104. The first adhesion layer 145 serves to adhere the touch sensing unit 10 to the liquid crystal display unit 14. In other words, the first sensing electrodes 104 of the transparent substrate 101 and one end of the flexible printed circuit board 13 on the first sensing electrodes 104 are adhered to the other side of the first polarizer 143 via the first adhesion layer 145. The second adhesion layer 146 is disposed between the first polarizer 143 and the second sensing electrodes 105 and the other end of the flexible printed circuit board 13 on the second sensing electrodes 105. The second adhesion layer 146 serves to adhere the first polarizer 143 to the second sensing electrodes 105. That is, the second sensing electrodes 105 and the other end of the flexible printed circuit board 13 on the second sensing electrodes 105 are adhered to one side of the first polarizer 143 via the second adhesion layer 146.

According to the above arrangement, the first sensing electrodes 104 and the second sensing electrodes 105 of the touch sensing unit 10 are respectively disposed on the transparent substrate 101 and the first substrate 1411. This solves the problem of bridge between the first and second sensing electrodes. Also, the processes necessitating masks are saved. In this case, the manufacturing risk is lowered and the ratio of good products is increased.

Please further refer to FIGS. 1 and 3. The touch display device 1 further includes a backlight module 16 disposed under the liquid crystal display unit 14 to provide light source for the liquid crystal display unit 14. The backlight module 16 has a receiving space 162 for receiving the liquid crystal display unit 14.

The design of the touch display device 1 of the present invention is applicable to both large-size touch display device and small-size touch display device so as to lower manufacturing risk and increase the ratio of good products. In this case, the manufacturing cost is lowered.

Figure 4:
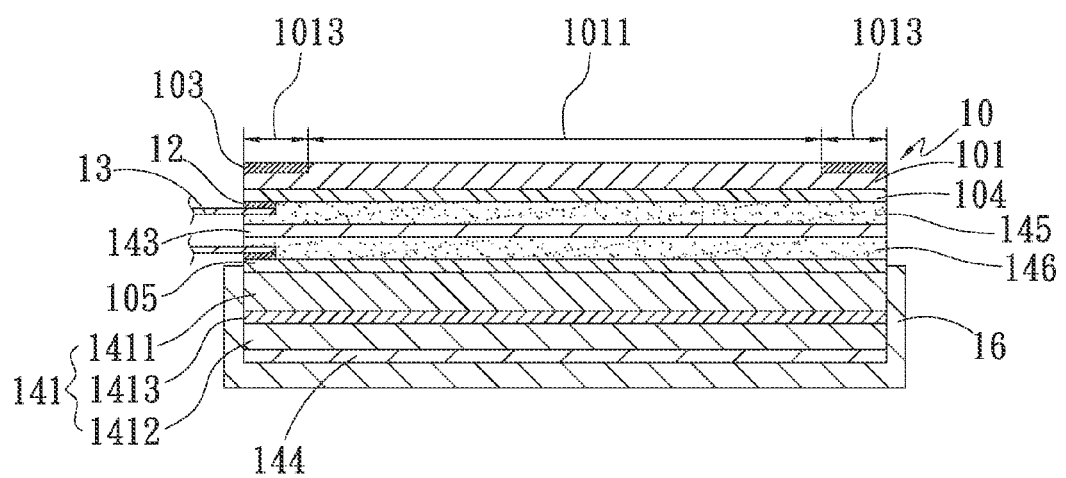
FIG. 4 is a sectional assembled view of a second embodiment of the present invention.

Please now refer to FIG. 4, which is a sectional exploded view of a second embodiment of the present invention. Also referring to FIG. 2, the second embodiment is substantially identical to the first embodiment in structure, connection relationship and effect and thus will not be further described hereinafter. The second embodiment is different from the first embodiment in that the shield layer 103 and the first sensing electrodes 104 are disposed on different sides of the transparent substrate 101. That is, the shield layer 103 is disposed on the other side of the peripheral section 1013 of the transparent substrate 101, (which side is distal from the first sensing electrodes 104) for providing concealing effect. The first sensing electrodes 104 are disposed on one side of the transparent substrate 101, (which side is proximal to the first polarizer 143) and positioned on the touch section 1011. Two ends of the first sensing electrodes 104 correspond to the shield layer 103 of the peripheral section 1013.

In this embodiment, the first sensing electrodes 104 are formed on the side of the transparent substrate 101 by means of, but not limited to, sputtering deposition. In practice, the first sensing electrodes 104 can be alternatively formed on the side of the transparent substrate 101 by means of gelatinization, electroplating or evaporation.

Moreover, the second embodiment is different from the first embodiment in that the first conductive adhesive layer 12 is positioned on one side of the end of the first sensing electrodes 104 on the peripheral section 1013, which side is distal from the transparent substrate 101.

The design of the touch display device 1 of the present invention lowers the manufacturing risk and increases the ratio of good products so that the manufacturing cost is lowered.

In conclusion, in comparison with the conventional technique, the present invention has the following advantages:
1. The ratio of good products is increased.
2. The manufacturing risk is lowered.
3. The manufacturing cost is lowered.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch display device comprising:
a touch sensing unit including a transparent substrate, a shield layer, multiple first sensing electrodes and multiple second sensing electrodes, the transparent substrate having a touch section and a peripheral section around the touch section, the shield layer being disposed on the peripheral section, the first sensing electrodes being disposed on the touch section, two ends of the first sensing electrodes extending onto the shield layer;
a first conductive adhesive layer disposed at one end of the first sensing electrodes on the peripheral section;
a flexible printed circuit board, one end of the flexible printed circuit board being disposed on the first conductive adhesive layer and electrically connected to the first sensing electrodes via the first conductive adhesive layer;
a liquid crystal display unit having a liquid crystal panel, a first polarizer and a second polarizer, the second sensing electrodes being disposed between one side of the first polarizer and one side of the liquid crystal panel, the second polarizer being disposed on the other side of the liquid crystal panel;
a first adhesion layer disposed between the first polarizer and the first sensing electrodes and one end of the flexible printed circuit board on the first sensing electrodes, the first adhesion layer serving to adhere the touch sensing unit to the liquid crystal display unit;
a second conductive adhesive layer disposed between one end of the second sensing electrodes on the peripheral section and the first polarizer, the other end of the flexible printed circuit board being attached to one side of the second conductive adhesive layer, which side is proximal to the first polarizer, the second conductive adhesive layer serving to electrically connect the other end of the flexible printed circuit board to the second sensing electrodes; and
a second adhesion layer disposed between the first polarizer and the second sensing electrodes and the other end of the flexible printed circuit board on the second sensing electrodes, the second adhesion layer serving to adhere the first polarizer to the second sensing electrodes.

2. The touch display device as claimed in claim 1, wherein the liquid crystal panel includes a first substrate, a second substrate and a liquid crystal layer, the liquid crystal layer being sandwiched between the first and second substrates, the second sensing electrodes being formed on one side of the first substrate, which side is distal from the liquid crystal layer, one side of the second substrate, which side is distal from the liquid crystal layer being attached to one side of the second polarizer.

3. The touch display device as claimed in claim 2, further comprising a backlight module disposed under the liquid crystal display unit to provide light source for the liquid crystal display unit.

4. The touch display device as claimed in claim 3, wherein the backlight module has a receiving space for receiving the liquid crystal display unit.

5. The touch display device as claimed in claim 1, wherein the first and second sensing electrodes are indium tin oxide (ITO) coatings or antimony tin oxide (ATO) coatings.

6. The touch display device as claimed in claim 1, wherein the first and second adhesion layers are made of optical clear adhesive (OCA) or optical clear resin (OCR).

7. The touch display device as claimed in claim 1, wherein the transparent substrate is made of a material selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

8. A touch display device comprising:
a touch sensing unit including a transparent substrate, a shield layer, multiple first sensing electrodes and multiple second sensing electrodes, the transparent substrate having a touch section and a peripheral section around the touch section, the first sensing electrodes being disposed on one side of the transparent substrate and positioned on the touch section, two ends of the first sensing electrodes corresponding to the peripheral section, the shield layer being disposed on the other side of the transparent substrate on the peripheral section;
a first conductive adhesive layer disposed at one end of the first sensing electrodes on the peripheral section;
a flexible printed circuit board, one end of the flexible printed circuit board being disposed on the first conductive adhesive layer and electrically connected to the first sensing electrodes via the first conductive adhesive layer;
a liquid crystal display unit having a liquid crystal panel, a first polarizer and a second polarizer, the second sensing electrodes being disposed between one side of the first polarizer and one side of the liquid crystal panel, the second polarizer being disposed on the other side of the liquid crystal panel;
a first adhesion layer disposed between the first polarizer and the first sensing electrodes and one end of the flexible printed circuit board on the first sensing electrodes, the first adhesion layer serving to adhere the touch sensing unit to the liquid crystal display unit;
a second conductive adhesive layer disposed between one end of the second sensing electrodes on the peripheral section and the first polarizer corresponding to the first conductive adhesive layer, the other end of the flexible printed circuit board being attached to one side of the second conductive adhesive layer, which side is proximal to the first polarizer, the second conductive adhesive layer serving to electrically connect the other end of the flexible printed circuit board to the second sensing electrodes; and
a second adhesion layer disposed between the first polarizer and the second sensing electrodes and the other end of the flexible printed circuit board on the second sensing electrodes, the second adhesion layer serving to adhere the first polarizer to the second sensing electrodes.

9. The touch display device as claimed in claim 8, wherein the liquid crystal panel includes a first substrate, a second substrate and a liquid crystal layer, the liquid crystal layer being sandwiched between the first and second substrates, the second sensing electrodes being formed on one side of the first substrate, which side is distal from the liquid crystal layer, one side of the second substrate, which side is distal from the liquid crystal layer being attached to one side of the second polarizer.

10. The touch display device as claimed in claim 9, further comprising a backlight module disposed under the liquid crystal display unit to provide light source for the liquid crystal display unit.

11. The touch display device as claimed in claim 10, wherein the backlight module has a receiving space for receiving the liquid crystal display unit.

12. The touch display device as claimed in claim 8, wherein the first and second sensing electrodes are indium tin oxide (ITO) coatings or antimony tin oxide (ATO) coatings.

13. The touch display device as claimed in claim 8, wherein the first and second adhesion layers are made of optical clear adhesive (OCA) or optical clear resin (OCR).

14. The touch display device as claimed in claim 8, wherein the transparent substrate is made of a material selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

* * * * *